Figures 1, 2:
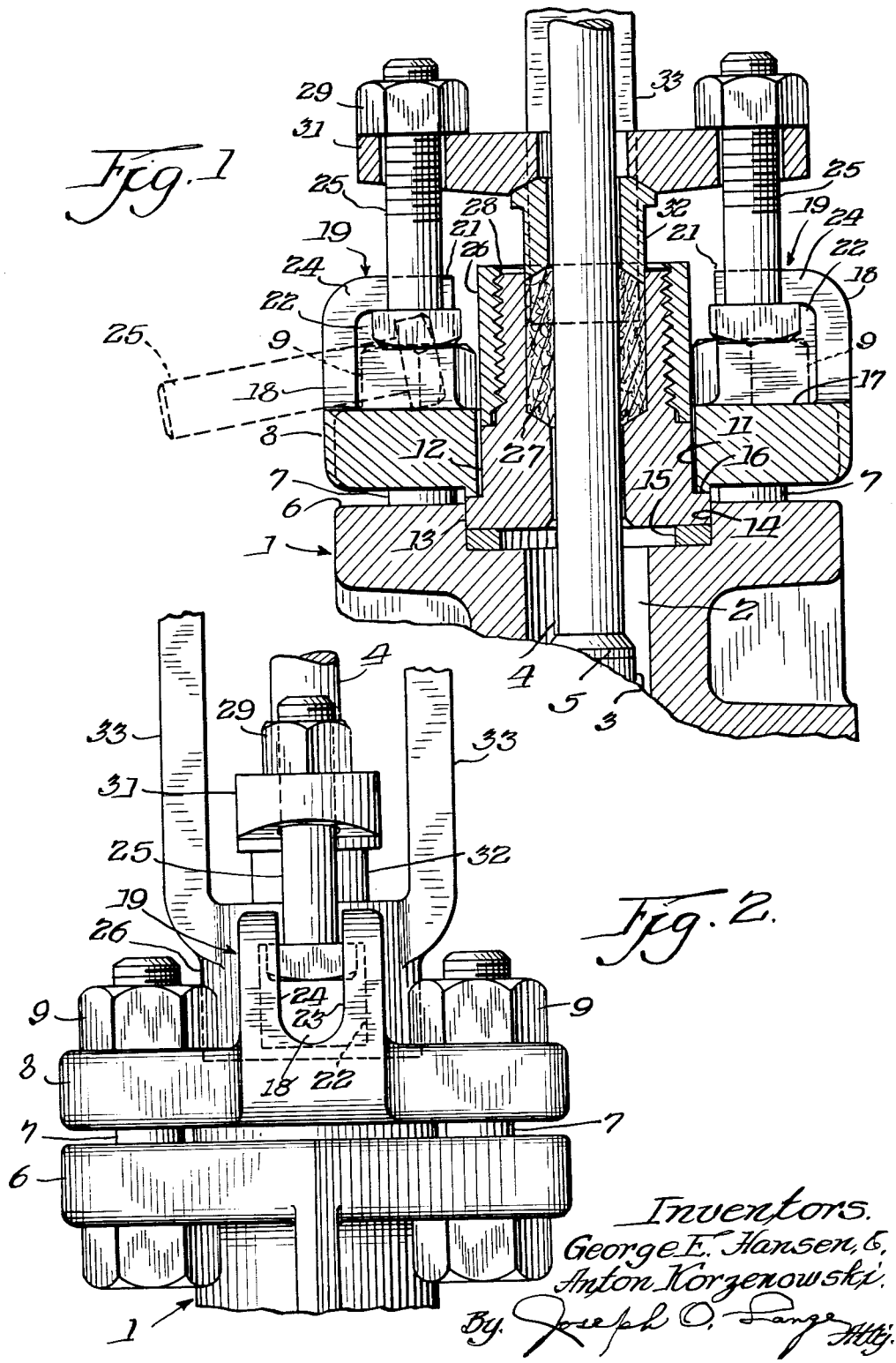

July 26, 1966  G. E. HANSEN ETAL  3,262,708
GLAND T-BOLT ARRANGEMENT WITH BONNET
INTEGRAL LUG CONSTRUCTION
Filed June 28, 1963

Inventors.
George E. Hansen, &
Anton Korzenowski.
By Joseph O. Lange Atty.

United States Patent Office 3,262,708
Patented July 26, 1966

3,262,708
GLAND T-BOLT ARRANGEMENT WITH BONNET
INTEGRAL LUG CONSTRUCTION
George E. Hansen, Elmwood Park, and Anton Korzenowski, Brookfield, Ill., assignors to Crane Co., Chicago, Ill., a corporation of Illinois
Filed June 28, 1963, Ser. No. 291,449
4 Claims. (Cl. 277—105)

This invention relates generally to a stuffing box mounting for valves, and, more particularly, it is concerned with a novel arrangement employing a gland T-bolt construction cooperating with the valve bonnet.

The invention is suitable not only for use on valves with which it is described in this case, but it may also be used with other types of pressure vessels, such as pumps, cylinders, or the like, in which a reciprocating or a rotating or a combined reciprocating-rotating shaft is employed in a leakproof mounting or bearing.

At the outset, in order to have a better appreciation of the merits of this contribution, it should be realized that when stuffing boxes are employed in connection with either rotating or reciprocating shafts the importance of properly aligning the stuffing box with the shaft or stem cannot be overly emphasized.

Therefore, it is a prime object of this invention to provide a construction possessing such desirable flexibility with respect to assuring accurate alignment and thereby overcome or minimize this problem.

Another important object of this invention is to provide for a gland T-bolt mounting in which the valve yoke and the bonnet flange is assembled substantially as a floating unit thus eliminating any possible misalignment of the valve stem and closure member in addition to that of the stuffing box.

More specifically, it is an important object of this invention to provide for a bonnet and gland bolt mounting therefor in which it is convenient to inspect the stuffing box packing or to remove the packing from the stuffing box through such convenience provided by a swinging gland bolt employing a standard or conventional square head.

Another important object is to provide for a specific form of preferably integral retaining lug construction for said gland bolts in which said lugs are provided with cast flats and a slot portion on an interior thereof cooperating therewith to allow for a swinging square head gland bolt without necessitating the more expensive constructions employing either groove pins, eye bolts, or the like.

Another object is to provide for an integral lug construction in which upon the insertion of the T-bolt used in this invention and completing the assembly, the said bolt is incapable of being bodily displaced while still possessing the ability to be tilted conveniently to one side to permit repacking or inspection of the stuffing box.

A still further object is to provide for a stuffing box mounting in relation to a bonnet member whereby said bonnet, gland flange, gland and gland bolts are bodily movable as an assembly around a peripheral portion of the stuffing box. This feature permits of adjusting the position of these valve parts to meet installation space restrictions or limitations around the valve.

Other and equally important objects and advantages will become more readily apparent upon proceeding with the description read in light of the accompanying drawings, in which:

FIG. 1 is a fragmentary sectional assembly view of a preferred embodiment of the invention; and FIG. 2 is an end exterior view of the construction shown in FIG. 1 at right angles thereto.

Similar reference numerals refer to similar parts throughout the several views.

Referring now to FIG. 1 as shown in a fragmentary manner, a valve casing generally designated 1 is shown having the usual valve chamber 2 in which a valve closure member fragmentarily shown at 3 is mounted so as to depend from the usual reciprocally movable valve stem 4, and being connected to the closure member by means of the conventional connection indicated at 5. The casing 1 is provided with a bonnet flange 6 suitably formed to receive a plurality of bonnet bolts 7 for the mounting of the bonnet member 8, the latter being suitably drilled (not shown) and retained to the bonnet flange 6 by the said bolts 7 and nuts 9.

The said bonnet is thus firmly attached to the valve body or casing 1. The bonnet member 8 is also centrally apertured as at 11 to receive the removable stuffing box 12 projecting therethrough, the latter member at its inner portion being flanged as at 13 for reception within the recess 14 of the casing 1. The said stuffing box bears against the annular gasket 15 to form a leakproof connection between the stuffing box 12 and the casing 1 at such location. The stuffing box is thus clamped as at the annular shoulder 16 between the bonnet member 8 and the bonnet flange 6 of the casing 1 as shown.

A predetermined annular clearance is provided between the aperture 11 and the outside diameter of the stuffing box 12 to impart an advantage in construction and adjustment of the setting during assembly to permit of the proper alignment of the stuffing box and yoke with the valve stem.

Not only does the aperture 11 permit of said alignment of the stuffing box, but it also permits the bonnet 8 together with its gland flange and bolt assembly to be revolvable as a unit around the stuffing box 12. This provides an obvious advantage where space limitations in installation are encountered.

Slotted portions 18 are provided in the hollow lugs generally designated 19 which are oppositely disposed and preferably, but not necessarily, integrally cast on the outer surface of the bonnet 8 as shown. Said lugs terminate as indicated at 21. On a lower portion thereof, the lugs are provided with the hollow chamber 22. It will be noted that the latter chamber 22 at a median portion thereof in forming the slot is defined by oppositely disposed vertical surfaces 23 and 24 for receiving the square head gland bolts 25. It should be understood that the insertion of the said gland bolts within the chamber 22 takes place before effecting the threaded attachment of the yoke 26 to the stuffing box 12. The annular clearance between the lower hub portion of the said yoke and the inwardly extending limits 21 of the lugs 19 is proportioned so as to be substantially smaller than the thickness of the head of the gland T-bolts. The latter structural feature is important when repacking the stuffing box chamber 27 becomes necessary. In such case, the nuts 29 are removed from the gland bolts 25. This permits the upward displacement of the gland flange 31 and the gland 32, allows for the gland bolts 25 to then assume the position shown in dotted lines. The slots 18 extend to the floor surface 17 and the height of the lug chamber 22 is sufficient to accommodate the full width of the bolt head, as indicated by said dotted lines. There is no danger of the bolt dropping out and being lost because as previously stated the annular clearance between inner end limits of the lugs as at 21 and the outside diameter of the hub of the yoke 26 prevents the bolt head from passing therebetween. The assembly of the gland flange 31 and the gland 32 takes place between the oppositely disposed yoke arms 33.

Thus it will be clear that by the simple expedient of attaching the gland bolts to the preferably integral lugs 19 a simple mounting is not only obtained but one which permits highly desirable convenience whenever it becomes necessary to repack the stuffing box while having the gland bolts securely out of the way and without danger of loss during such operation.

It should now be clear that in allowing for the annular clearance between the stuffing box outside diameter and the bonnet central aperture 11 permits of taking care of any misalignment during the course of positioning the bonnet without danger of seriously affecting the alignment of the stuffing box 12 with the valve stem or shaft 4.

In summary, it will be appreciated that in view of the fact that the yoke 26 is threadedly attached at 28 to the stuffing box 12 and since the latter member is accurately positioned with relation to the stem it follows that similar accuracy is effected in aligning the yoke 26 with the yoke sleeve and other valve actuating mechanism (not shown). Thus the benefit from the invention is two-fold in not only aligning the stuffing box with the stem 4, but also aligning the said stem with the yoke actuating mechanism.

While only a single embodiment has been shown and described, it will be appreciated that this is for purpose of illustration only and the scope of the invention should be measured by the appended claims.

We claim:

1. In a valve construction or the like, the combination of a valve casing and a bonnet therefor having a substantially central apertured portion, a stuffing box mounted within said apertured portion to project therethrough, a stem projecting through said stuffing box, a valve yoke on said stuffing box for journalling said stem having oppositely disposed yoke arms on a hub portion of said yoke spaced on each side of said stuffing box, said bonnet having on an outer surface portion thereof oppositely disposed hollow lugs substantially at right angles to the said yoke arms, the said lugs being open on upper and side portions thereof and also on inner side portions thereof opposite said stuffing box and yoke, T-head bolts of square head configuration cooperating with said lugs and with their square head portions receivable within said hollow lugs, the width of the said open portions of said lugs and the height of the hollow portions of the said lugs permitting said bolts to be swung outwardly within said upper and side open portions in a direction away from the said stuffing box when packing the latter member, the said height of the hollow portions of the said lugs being substantially greater than the width of a square head portion of the T-bolt, the inner limits of said lugs and the outer peripheral limits of the hub portion of said yoke providing a space therebetween of such proportions as to be less than the thickness of the said bolt heads whereby to inhibit passage of the latter through said space past said yoke hub, the said stuffing box and yoke being predeterminately rotatable as an assembly relative to said bonnet, the said yoke at said hub portion being threadedly attached to the said stuffing box to prevent said bolts from dropping out of said lugs.

2. The subject matter of claim 1, the limits of rotatability of the said stuffing box and yoke relative to said bonnet being defined by the space between said lugs.

3. The subject matter of claim 2, the arms of said yoke contacting said lugs upon said predetermined rotation of said yoke and said stuffing box to inhibit further rotation of said latter members.

4. The subject matter of claim 1, at least one of the open upper and side portions of the said lugs extending vertically downwardly to a plane defined by an upper surface of the said bonnet.

References Cited by the Examiner

UNITED STATES PATENTS

| 1,903,028 | 3/1933 | Carlson | 277—105 X |
| 2,744,775 | 5/1956 | Bredtschneider | 251—214 X |
| 3,162,455 | 12/1964 | Englert et al. | 277—105 |

SAMUEL ROTHBERG, *Primary Examiner.*